US006851446B2

(12) United States Patent
van der Meijden et al.

(10) Patent No.: US 6,851,446 B2
(45) Date of Patent: Feb. 8, 2005

(54) ADAPTOR ESPECIALLY FOR USE IN CONNECTION WITH SWIMMING POOL RETURN LINES

(75) Inventors: Hendrikus Johannes van der Meijden, Midrand (ZA); Peter Hugh Harrison, Centurion (ZA); Mark J. Bauckman, Boca Raton, FL (US)

(73) Assignee: Zodiac Pool Care, Inc., Pompano Beach, FL (US)

( * ) Notice: Subject to any disclaimer, the term of this patent is extended or adjusted under 35 U.S.C. 154(b) by 0 days.

(21) Appl. No.: 10/293,407

(22) Filed: Nov. 13, 2002

(65) Prior Publication Data

US 2004/0089343 A1 May 13, 2004

(51) Int. Cl.[7] .................... F16L 37/086; F16L 37/138
(52) U.S. Cl. .................... 137/315.42; 4/490; 4/496; 137/362; 285/205; 285/316; 285/317; 285/320
(58) Field of Search .................. 285/57, 189, 20, 285/205, 216, 217, 226, 314, 316, 317, 318, 319, 320; 4/286, 288, 292, 496, 503, 490; 137/15.13, 15.14, 15.17, 15.18, 315.42, 317, 318, 362; 138/89, 94

(56) References Cited

U.S. PATENT DOCUMENTS

| 330,502 | A | * | 11/1885 | McFarland .................. 285/210 |
| 567,115 | A | * | 9/1896 | Atkinson .................... 285/314 |
| 621,108 | A | * | 3/1899 | Leonard ..................... 285/314 |
| 757,641 | A | * | 4/1904 | Saunders .................... 285/314 |
| 2,911,859 | A | * | 11/1959 | Longley ..................... 137/318 |
| 3,265,030 | A | | 8/1966 | Stevens |
| 3,275,023 | A | * | 9/1966 | Raspante .................... 138/94 |
| 3,473,555 | A | * | 10/1969 | Martin et al. .............. 138/89 |
| 3,776,464 | A | * | 12/1973 | Proffit ..................... 239/229 |
| 3,914,966 | A | * | 10/1975 | Bello ....................... 138/89 |
| 4,248,271 | A | * | 2/1981 | Burgess ..................... 138/89 |
| 5,197,567 | A | * | 3/1993 | Rabalais .................... 184/1.5 |
| 5,560,388 | A | * | 10/1996 | Caldwell .................... 137/318 |
| 5,590,676 | A | * | 1/1997 | Wagner ...................... 137/318 |
| 6,029,709 | A | * | 2/2000 | Burgess ..................... 138/89 |
| 6,041,453 | A | | 3/2000 | Barrow et al. |
| 6,189,556 | B1 | | 2/2001 | Blake et al. |
| 6,446,662 | B1 | * | 9/2002 | Wagner ...................... 138/94 |
| 6,499,771 | B1 | * | 12/2002 | Snyder et al. .............. 285/319 |
| 6,601,244 | B1 | * | 8/2003 | Goettl ...................... 4/490 |
| 6,601,255 | B1 | * | 8/2003 | van der Meyden et al. ... 15/1.7 |

FOREIGN PATENT DOCUMENTS

| DE | 201 10 397 U1 | 12/2002 |
| GB | 963878 | 7/1964 |
| WO | WO 00/73691 A1 | 2/2000 |
| WO | WO 02/50390 A1 | 6/2002 |

OTHER PUBLICATIONS

International Search Report in PCT/US03/35888.
Instruction sheet for Polaris "1 ½" Stub Pipe Connection Kit" (two pages; bears notation "8/91".

* cited by examiner

Primary Examiner—George L. Walton
(74) Attorney, Agent, or Firm—Dean W. Russell; Kilpatrick Stockton LLP

(57) ABSTRACT

Adaptor assemblies are detailed. Preferably for connecting automatic pool cleaning apparatus to return lines of swimming pool water-circulation systems, the assemblies utilize spurs that may affirmatively grip, or cut or gouge into, the return lines to retain the adaptors in position. Releasing the adaptors may occur with use of a release line which retracts the spurs when activated. Avoiding release of the spurs through rotation of the assemblies allows rotation for other purposes as, for example, to connect the device to a hose or other apparatus. A bellows or other assembly additionally may be included with the assemblies to facilitate their sealing against walls or other surfaces in which the return lines are embedded.

16 Claims, 3 Drawing Sheets

ADAPTOR ESPECIALLY FOR USE IN CONNECTION WITH SWIMMING POOL RETURN LINES

FIELD OF THE INVENTION

This invention relates to adaptors and more particularly (although not exclusively) to devices for interconnecting return lines of swimming pools with pressure-side automatic pool cleaners.

BACKGROUND OF THE INVENTION

U.S. Pat. No. 6,189,556 to Blake, et al., incorporated herein in its entirety by this reference, discloses valves for distributing water to multiple "pop-up" cleaning heads embedded in floors and walls of pools. Although not especially relevant to the invention described herein, the valves of the Blake patent connect to return lines of water-filtration or circulation systems of swimming pools. As noted in the Blake patent, such systems conventionally may include a length of polyvinyl chloride (PVC) pipe extending from a filter that "receives pumped pool water from the high pressure outlet port of a conventional pool pump" which in turn "receives water from the main drain of the swimming pool." See Blake, col. 5, ll. 31–34.

U.S. Pat. No. 6,041,453 to Barrow, et al., likewise incorporated herein in its entirety by this reference, describes debris skimmers designed for connection to swimming pool return lines. Although again not especially relevant to the present invention, the skimmers of the Barrow patent utilize flexible hose to extend from fittings of a return line. Such hoses connect to corresponding fittings in the undersides of the skimmers.

Neither the Blake patent nor the Barrow patent contemplates adapting connections to different sizes of return lines. This may present significant problems in many pools, as differing diameters of PVC (or other) pipe frequently are used by different builders and in different types of pools. Absent some means of adapting products to these differing-diameter lines, effective utilization of the products to facilitate cleaning of swimming pools likely will be impeded (if not impossible).

Polaris Pool Systems, Inc. markets a return line adaptor as Part No. 9-100-8003 (the "Polaris Adaptor"). Intended for use with its Polaris 360 pressure-side automatic pool cleaner, the Polaris Adaptor consists of an "expansion connector" with an internally-threaded portion and an elongated portion designed for insertion into a larger-diameter return line. The elongated portion includes multiple leaves arranged circularly and retained in position by an elastic sheath. After the elongated portion is inserted into the return line, the internally-threaded portion may be rotated clockwise. Doing so overcomes the bias of the elastic sheath and expands the diameter formed by the leaves until it matches that of the return line and thus is frictionally fitted therein. Rotating the threaded portion counterclockwise apparently releases the frictional fitting, as doing so decreases the diameter of the expandable leaves.

SUMMARY OF THE INVENTION

The present invention provides alternatives to the Polaris Adaptor. Unlike the frictional fittings employed by the Polaris Adaptor, for example, those of the present invention employ spurs that may affirmatively grip, or cut or gouge into, the return lines. Hence, adaptors of the invention preferably are not intended to be removable merely by rotation of its external components. Instead, they advantageously may include a release line that, when activated, retracts the spurs so as to permit removal of the device. Avoiding rotational release also allows rotation for other purposes as, for example, to connect a fitting of the device to a hose or other apparatus.

Preferred embodiments of the invention include three pivoting spurs sharing a common pivot plane and whose cutting surfaces are each spaced approximately one hundred twenty degrees from the others. An arm connected to each spur, together with a coil spring, biases the spurs outward, so that their cutting surfaces tend to contact the interior of any pipe in which they are inserted. Extracting a release line compresses the spring, hence retracting the spurs and permitting removal of the device from within the pipe.

Optionally (albeit preferably) included as part of the invention is a bellows (or similar) assembly. Such assembly, itself optionally including one or more wire (or other) hoops for stress alleviation, may seal against a wall or other surface in which the fluid-conveying return line is embedded. This seal helps maintain the integrity of the adaptor connection, as it assists in preventing pressurized water from flowing unwanted through any openings associated with the adaptor. Thus, it facilitates use of the adaptor of the present invention with multiple return lines of varying sizes and diameters. The invention, further, sometimes may be used without removing eyeball fittings previously placed in the return lines.

It thus is an optional, non-exclusive object of the present invention to provide adaptor assemblies.

It is also an optional, non-exclusive object of the present invention to provide adaptors primarily intended to connect to return lines of water-filtration or -circulation systems of swimming pools.

It is another optional, non-exclusive object of the present invention to provide adaptors designed to cut, or gouge, into pipe for retention purposes (as well as provide frictional fitting into the pipe if appropriate).

It is a further optional, non-exclusive object of the present invention to provide one or more spring-loaded spurs to perform the cutting or gouging.

It is an additional optional, non-exclusive object of the present invention to provide a release mechanism adapted to retract the spurs from the pipe.

It is yet another optional, non-exclusive object of the present invention to provide an adaptor able to rotate without affecting its engagement with a return line.

Other objects, features, and advantages of the present invention will be apparent to those skilled in the relevant art with reference to the remaining text and drawings of this application.

DETAILED DESCRIPTION

Figure 1:
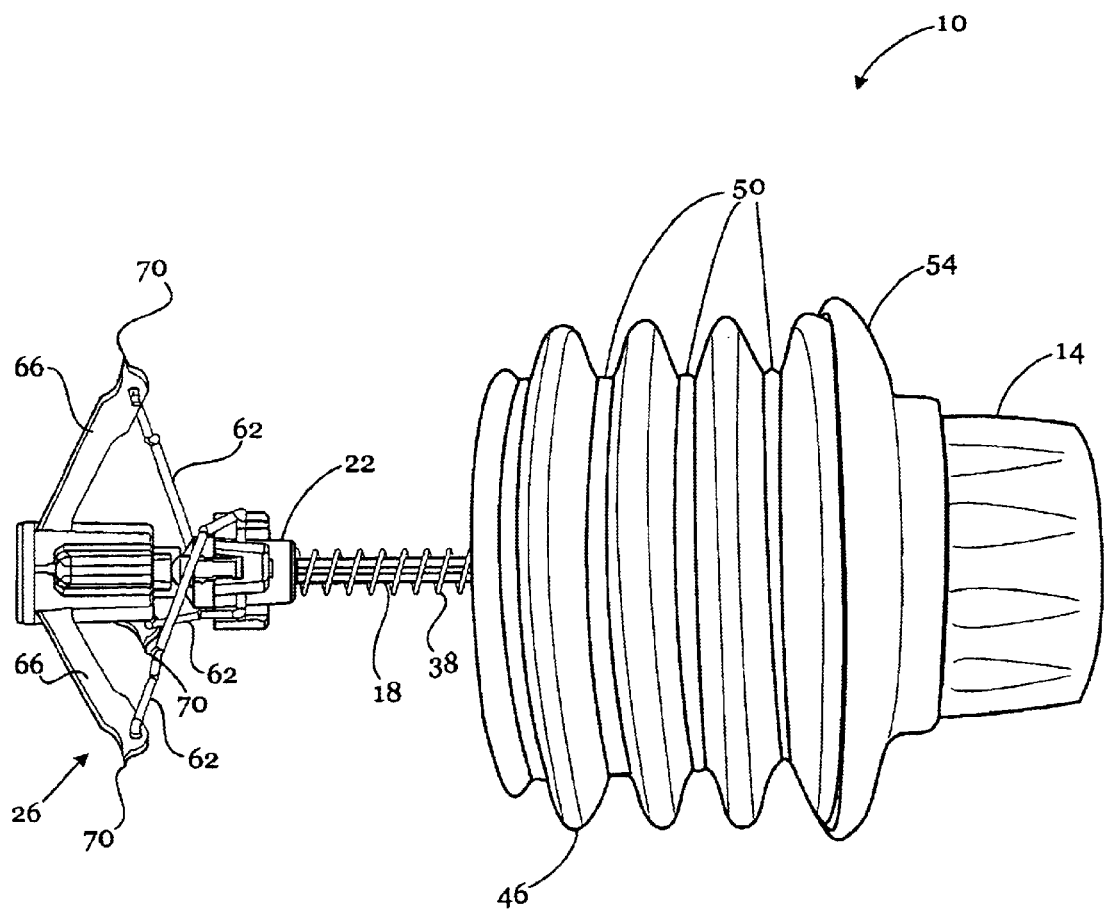
FIG. 1 depicts an exemplary embodiment of the adaptor assembly of the present invention.
Figure 2:
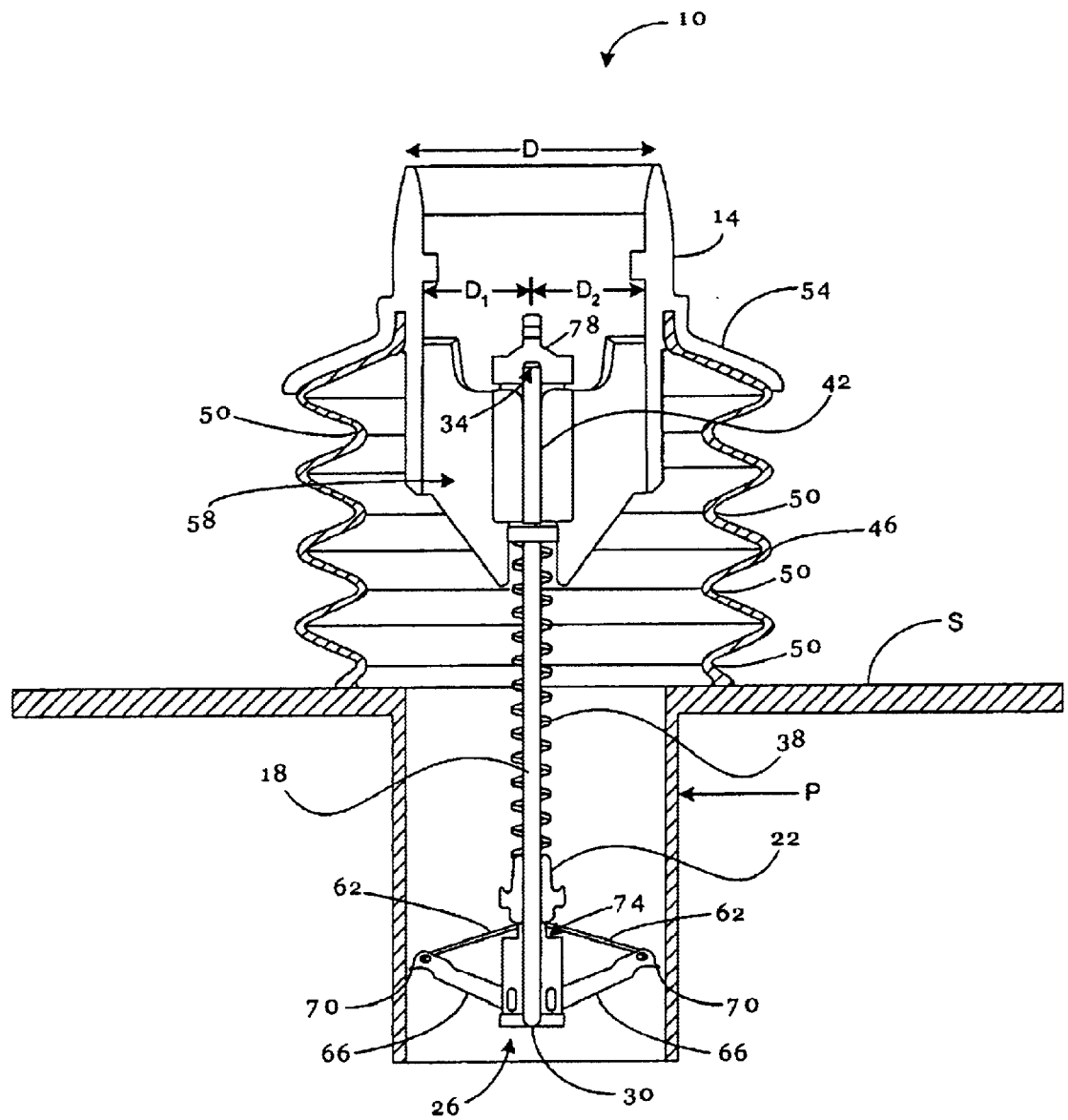
FIG. 2 is a cross-sectional view of the adaptor assembly of FIG. 1.

Illustrated in FIGS. 1–2 is an example of adaptor assembly 10 of the present invention. Included as parts of assembly 10 are fitting 14, rod 18, and slider 22, the latter adapted to slide along rod 18. Also shown in FIGS. 1–2 is spur assembly 26 positioned at an end 30 of rod 18. The other end 34 of rod 18, by contrast, connects (directly or indirectly) to fitting 14.

Circumscribing most or all of the exposed length of rod 18 between fitting 14 and slider 22 is coil spring 38. Spring 38 functions to bias slider 22 toward spur assembly 26, hence away from fitting 14. Preferred embodiments of assembly 10 additionally include release line 42 running from fitting 14 along rod 18 to slider 22. When pulled outward from fitting 14 with force sufficient to overcome that of spring 38, line 42 forces slider 22 toward fitting 14 (rather than away from it, as the force of spring 38 tends to cause).

Optionally included as part of assembly 10 is bellows 46 or a similar sealing mechanism. Bellows 46, adapted for placement between fitting 14 and the wall, floor, or other surface S in which a return line is embedded (or from which it protrudes), is expandable and compressible. Hoops 50, shown in FIG. 1 as positioned around bellows 46, tend to assist in containment of hoop stresses experienced by bellows 14, thus facilitating sealing bellows 46 to the surface S.

Preferred versions of fitting 14 are adapted to receive a hose or other fluid-conveying device. Typically (although not necessarily), the received hose will communicate with a mobile, in-pool cleaning device, such as a pressure-side automatic pool cleaner (APC). Pressurized water flowing through the return line will pass through fitting 14 into the hose for conveyance to the pressure-side APC. Although assembly 10 is especially useful in connection with the APC described in co-pending U.S. patent application Ser. No. 09/673,873, filed Feb. 28, 2001, entitled "Pool Cleaner," the contents of which are incorporated herein in their entirety by this reference, those skilled in the art will recognize it may be used in connection with other APCs, or with non-APC devices, present in swimming pools, spas, or other water-containing vessels.

In the embodiment of assembly 10 depicted in FIGS. 1–2, fitting 14 includes flange 54 and central spider 58. Flange 54, in use, contacts bellows 46 and serves as a base bounding movement of the bellows 46. Spider 58, by contrast, receives rod 18 while allowing fluid to flow (longitudinally) through assembly 10. Rod 18 advantageously is received centrally within diameter D of assembly 10 (i.e. so that $D_1$ equals $D_2$), although conceivably it could be positioned elsewhere within the diameter D.

Arms 62 connect slider 22 and spur assembly 26. Such connection causes spurs 66 (or other appropriate devices) to pivot when slider 22 moves along rod 18, with spurs 66 rotating outward as slider 22 moves toward end 30 and inward as slider 22 moves toward end 34. As spurs 66 rotate outward, their sharp edges 70 cut, or gouge, into pipe P of the return line, thus gripping the pipe P and securing the connection between assembly 10 and pipe P. Because this cutting or gouging may occur anywhere along the outward pivot paths of the spurs 66, assembly 10 thus may be secured to pipes P of various diameters. Further, omission of expandable leaves, for example, allows the connection of assembly 10 and pipe P to avoid any substantial disruption of the flow of fluid through the pipe P.

Preferred embodiments of assembly 10 include three arms 62 and, correspondingly, three spurs 66 spaced angularly approximately one-hundred twenty degrees apart. Those skilled in the art will, however, recognize that more or fewer numbers of arms 62 and spurs 66 may be employed instead. Indeed, gripping mechanisms other than arms 62 and spurs 66 alternatively may be utilized to secure connection of assembly 10 to pipe P.

Although spurs 66 advantageously cut into pipe P, their cutting action does not necessarily prevent removal of assembly 10 from the pipe P. Instead, such removal may occur relatively easily by pivoting spurs 66 inward along the same path as they pivoted outward. This reversal may be accomplished in any manner suitable to overcome the force of spring 38 and cause slider 22 to move along rod 18 toward end 34.

Figure 3:
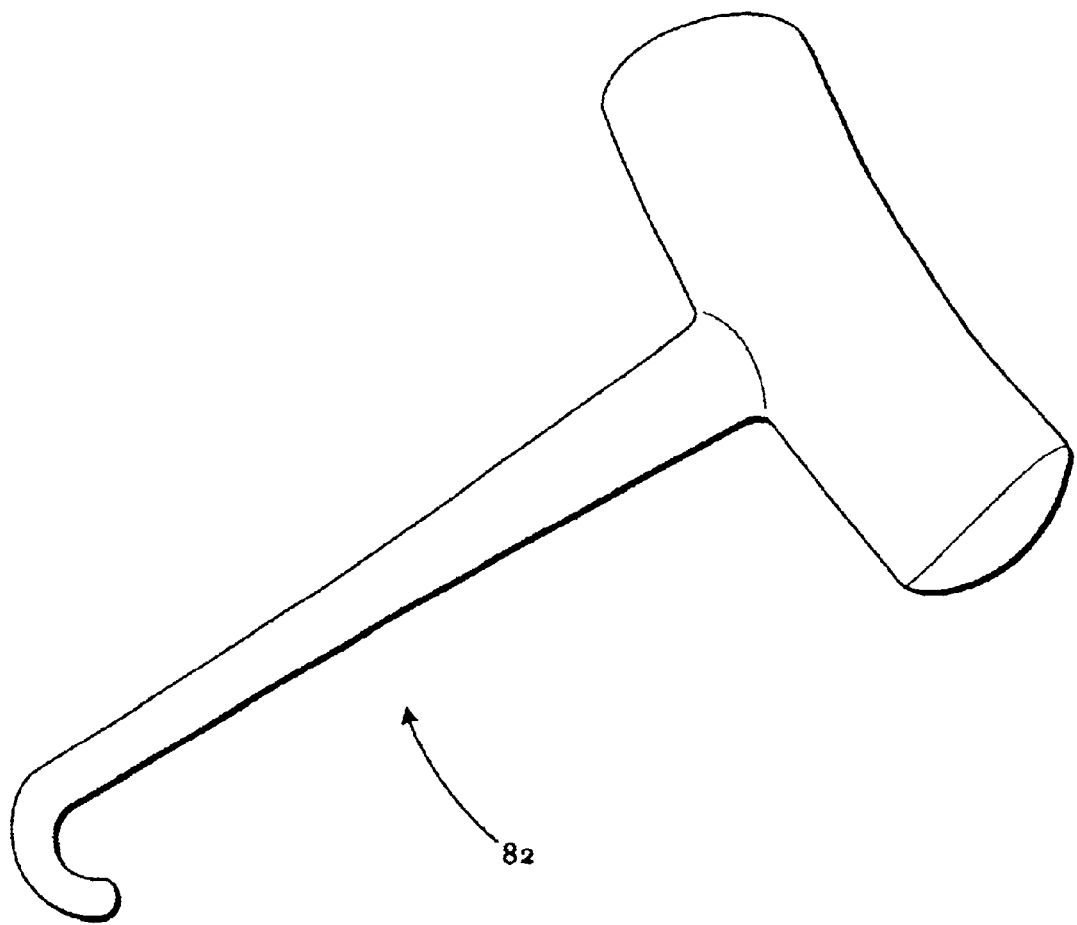
FIG. 3 depicts a hook useful as part of a release mechanism for the adaptor assembly of FIG. 1.

One type of reversal mechanism utilizes release line 42, which runs along much of the length of rod 18 within spring 38. Line 42, which may be a cable, cord, or other suitable object, terminates in head 74, with the opposite end of line 42 terminating in foot 78 abutting spider 58. Preferred versions of foot 78 include an opening or recess in which hook 82 (FIG. 3) may be received. Because head 74 is sufficiently enlarged as to be unable to pass between rod 18 and spring 38, pulling line 42 outward through fitting 14 (i.e. away from surface S and pipe P) causes head 74 to force slider 22 to move toward end 34, compressing spring 38 and pivoting spurs 66 inward. These actions release the connection between spurs 66 and pipe P, thereby permitting removal of assembly 10 from within the pipe P.

By releasing spurs 66 from pipe P in this manner, rotation of fitting 14 has no adverse effect on the connection between assembly 10 and pipe P. Fitting 14 thus may be adapted to rotate as appropriate or desired to facilitate its connection to a hose or other device. One preferred version of fitting 14 incorporates a one-quarter-turn locking mechanism, so that rotating the fitting 14 approximately ninety degrees secures its attachment to the hose.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. An adaptor assembly for connecting a hose to a pipe (i) forming a return line of a swimming pool water-circulation system and (ii) having an interior surface, the assembly comprising:

a. a fitting adapted, in use, to connect to the hose; and b. means for cutting or gouging the interior surface of the pipe so as to secure the fitting thereto in use.

2. An adaptor assembly according to claim 1 in which the cutting or gouging means comprises a pivoting device having a sharp edge.

3. An adaptor assembly according to claim 2 in which the pivoting device comprises a spur.

4. An adaptor assembly according to claim 2 in which the cutting or gouging means comprises a plurality of spurs.

5. An adaptor assembly according to claim 1 in which the fitting is rotatable, with such rotation not affecting its connection to the interior of the pipe.

6. An adaptor assembly according to claim 1 further comprising means for sealing the fitting to a wall or floor in which the pipe extends.

7. An adaptor assembly according to claim 6 in which the sealing means comprises an expandable and compressible device.

8. An adaptor assembly according to claim 1 further comprising:
   a. a rod connected to the fitting;
   b. a spring circumscribing part of the rod;
   c. a slider circumscribing part of the rod and abutting the spring;
   d. at least one arm connected to the slider and the cutting or gouging means; and
   e. a release line running along part of the rod and adapted to contact the slider.

9. An adaptor assembly according to claim 8 in which expansion of the spring causes the cutting or gouging means to pivot, in use, outward toward the interior surface of the pipe.

10. An adaptor assembly according to claim 9 in which extraction of the release line causes the slider to move toward the fitting, compressing the spring and causing the cutting or gouging means to pivot inward.

11. An adaptor assembly according to claim 1 further comprising means for extracting the cutting or gouging means from the interior surface of the pipe.

12. An adaptor assembly according to claim 11 in which the extracting means comprises a release line having an enlarged head.

13. An adaptor assembly for connecting an object to a fluid-conveying line having an interior surface, the assembly comprising:
   a. a fitting adapted, in use, to connect to the object;
   b. means for cutting or gouging the interior surface of the fluid-conveying line so as to secure the fitting thereto in use; and
   c. means for sealing the fitting to a wall or floor in which the fluid-conveying line extends, such sealing means comprising an expandable and compressible device in the form of a bellows.

14. An adaptor assembly according to claim 13 in which the sealing means further comprises at least one hoop contacting the bellows.

15. An adaptor assembly connecting, via a hose, an automatic pool cleaner to a return line of a swimming pool water-circulation system, the return line comprising a pipe with an interior surface, the assembly comprising:
   a. a rotatable fitting adapted, in use, to connect to the hose; and
   b. means, independent of rotation of the fitting, for securing the fitting to the return line, such securing means comprising means for cutting or gouging the interior surface of the pipe.

16. An adaptor assembly according to claim 15 in which the fitting comprises a flange, further comprising a bellows which, in use, is positioned between the flange and a surface of a pool from which the return line extends.

* * * * *